United States Patent
Um

(10) Patent No.: US 11,645,002 B2
(45) Date of Patent: May 9, 2023

(54) APPARATUS AND METHOD FOR CONTROLLING AND STORING MAP DATA IN A MEMORY SYSTEM

(71) Applicant: SK hynix Inc., Icheon (KR)

(72) Inventor: Gi Pyo Um, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/172,934

(22) Filed: Feb. 10, 2021

(65) Prior Publication Data
US 2022/0075553 A1 Mar. 10, 2022

(30) Foreign Application Priority Data
Sep. 8, 2020 (KR) .................. 10-2020-0114621

(51) Int. Cl.
*G06F 3/06* (2006.01)
(52) U.S. Cl.
CPC .......... *G06F 3/0655* (2013.01); *G06F 3/0608* (2013.01); *G06F 3/0679* (2013.01)
(58) Field of Classification Search
CPC ............. G06F 2212/401; G06F 3/0608; G06F 3/0679; G06F 12/0253; G06F 3/0655; G06F 3/061; G06F 3/0656
USPC ................................................. 711/154, 103
See application file for complete search history.

(56) References Cited

U.S. PATENT DOCUMENTS

| | | | |
|---|---|---|---|
| 9,268,682 B2 | 2/2016 | Tomlin et al. | |
| 10,372,341 B2 | 8/2019 | Oshinsky et al. | |
| 2016/0011786 A1* | 1/2016 | Ninose | G06F 12/0246 711/103 |
| 2019/0108891 A1* | 4/2019 | Lee | G11C 29/38 |
| 2019/0146910 A1* | 5/2019 | Cho | G06F 3/0656 711/103 |
| 2019/0347194 A1* | 11/2019 | Lu | G06F 12/0246 |
| 2020/0301847 A1* | 9/2020 | Miura | G06F 12/0246 |
| 2020/0371910 A1* | 11/2020 | Ke | G06F 13/1668 |
| 2021/0248050 A1* | 8/2021 | Kolan | G06F 12/109 |
| 2021/0294752 A1* | 9/2021 | Palmer | G06F 12/1027 |

FOREIGN PATENT DOCUMENTS

KR 1020190136492 A 12/2019

* cited by examiner

*Primary Examiner* — Hashem Farrokh

(57) ABSTRACT

A memory system includes a memory device including a plurality of non-volatile memory cells; and a controller configured to program data input from an external device in the memory device, generate a map data item corresponding to the data, perform a compression operation on second map data when the second map data includes no empty area for the map data item. A timing of updating first map data stored in the memory device based on the second map data is determined according to whether the second map data is compressed or not.

20 Claims, 7 Drawing Sheets

APPARATUS AND METHOD FOR CONTROLLING AND STORING MAP DATA IN A MEMORY SYSTEM

CROSS-REFERENCE TO RELATED APPLICATIONS

This patent application claims the benefit of Korean Patent Application No. 10-2020-0114621, filed on Sep. 8, 2020, the entire disclosure of which is incorporated herein by reference.

TECHNICAL FIELD

One or more embodiments described herein relate to an apparatus and method for controlling information in a memory system.

BACKGROUND

Recently, a paradigm for a computing environment has shifted to ubiquitous computing, which enables computer systems to be accessed virtually anytime and anywhere. As a result, the use of portable electronic devices (e.g., mobile phones, digital cameras, notebook computers, or the like) are rapidly increasing. Such portable electronic devices each may use or include a memory system having at least one memory device. The memory system may be a data storage device. The data storage device can be used as a main storage device or an auxiliary storage device of a portable electronic device.

Unlike a hard disk, such a data storage device uses non-volatile semiconductor memories, exhibits improved stability and durability, has no mechanical driving parts (e.g., a mechanical arm), and thus provides high data access speeds and relatively low power consumption. Examples of the data storage device having such advantages include, but are not limited to, Universal Serial Bus (USB) memory devices, memory cards having various interfaces, solid state drives (SSDs), and so on.

BRIEF DESCRIPTION OF THE DRAWINGS

The description herein makes reference to the accompanying drawings wherein like reference numerals refer to like parts throughout the figures.

Figure 1:
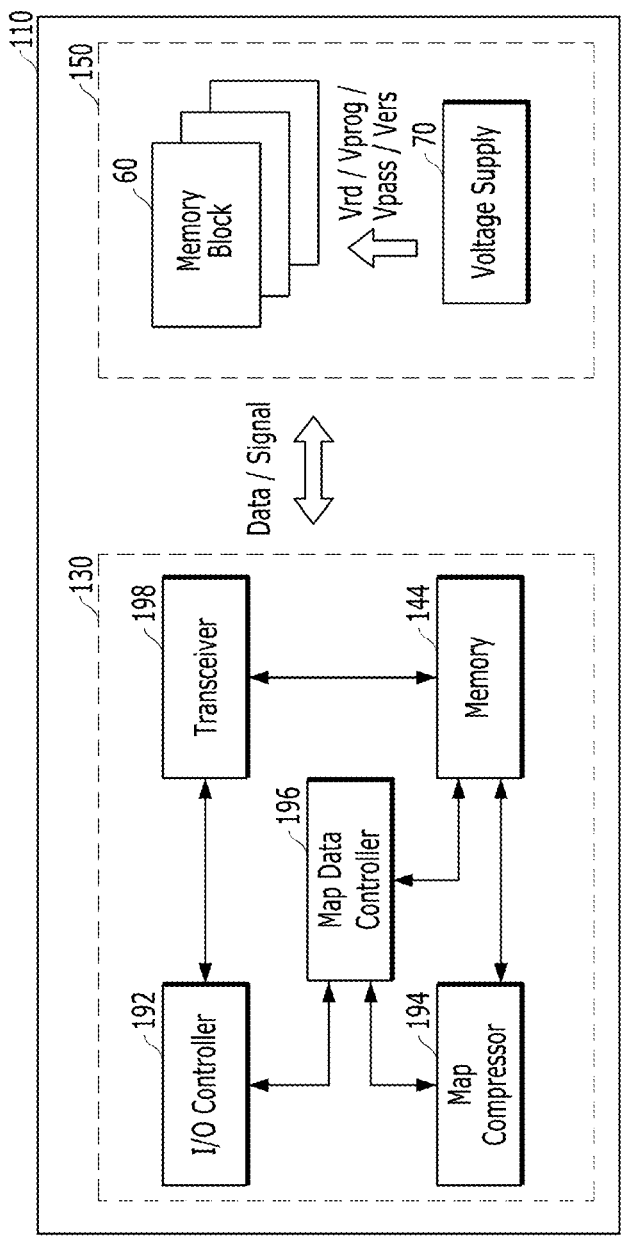
FIG. 1 illustrates a memory system according to an embodiment.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

DETAILED DESCRIPTION

Various embodiments of the disclosure are described below with reference to the accompanying drawings. Elements and features of the disclosure, however, may be configured or arranged differently to form other embodiments, which may be variations of any of the disclosed embodiments.

In this disclosure, the terms "comprise," "comprising," "include," and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware—for example, circuits, memory storing program instructions executable to implement the operation, etc. Reciting that a block/unit/circuit/component is "configured to" perform one or more tasks is expressly intended not to invoke 35 U.S.C. § 112, sixth paragraph, for an interpretation of the block/unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

As used herein, these terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data or a data item may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

An embodiment of the disclosure can provide a data process system and a method for operating the data processing system. The data processing system includes components and resources such as a memory system and a host, and is capable of dynamically allocating plural data paths used for data communication between the components based on usages of the components and the resources.

Various embodiments described herein provide a method and apparatus for compressing map data which may be used for improving data input/output performance of a memory system before flushing or updating the map data into a non-volatile memory device, so that a timing of flushing or updating the map data into the non-volatile memory device could be delayed. This may produce a commensurate reduction in resources used to perform data input/output operations and may improve operational efficiency. In one embodiment, the memory system may generate map data when storing data in the non-volatile memory device in response to a request or a type of data input from an external device, and may determine whether the map data is compressed before flushing or updating the map data into the non-volatile memory device. Accordingly, the memory system can change the timing of flushing or updating the map data into the non-volatile memory device.

According to an embodiment, the memory system may reduce consumption of resources such as a cache memory allocated and used for internal operations such as address translation and map information management. Additionally, or alternatively, the memory system may determine whether to compress map data to change a timing of map updating so as to use or re-distribute much more available resources for the data input/output operations corresponding to requests input from the external device and in order to improve data input/output performance of the memory system.

In an embodiment, a memory system can include a memory device including a plurality of non-volatile memory cells; and a controller configured to program data input from an external device in the memory device, generate a map data item corresponding to the data, perform a compression operation on second map data when the second map data includes no empty area for the map data item. A timing of updating first map data stored in the memory device based on the second map data can be determined according to whether the second map data is compressed or not.

When the second map data includes an empty area for the map data item, the controller can be configured to add the map data item to the second map data. The controller can be configured to perform no compression operation on the second map data.

When the second map data fully filled with map data items is not compressed through the compression operation, the controller can be configured to update the first map data based on the second map data, either generate new second map data or reset the second map data, and add the map data item to the new second map data or the reset second map data.

The controller can be configured to change an identifier indicating a data structure of the second map data based on whether the second map data is compressed.

The second map data can include at least some map data items, each map data item associating each physical address with each logical address, on which the compression operation is performed. The second map data can include at least one map data item after the second map data is compressed, the at least one map data item including a start logical address of plural continuous logical addresses corresponding to the at least map data items and a count value corresponding to the number of the plural continuous logical addresses.

The second map data can be compressed when the at least some map data items correspond to sequential data items programmed in the memory device individually.

The second map data can be stored in a volatile memory. The controller can be configured to allocate a preset size of the volatile memory for the second map data, wherein the preset size is fixed regardless of whether the second map data is compressed or not.

The controller can be configured to compress the second map data multiple times. The controller can be configured not to compress a map data item which has been previously compressed in the second map data.

In another embodiment, a method for operating a memory system can include programming data input from an external device in a memory device including a plurality of non-volatile memory cells; generating a map data item corresponding to the data; and compressing second map data when the second map data includes no empty area for the map data item. A timing of updating first map data stored in the memory device based on the second map data can be determined according to whether the second map data is compressed or not.

The method can further include adding the map data item to the second map data when the second map data includes an empty area for the map data item; and skipping compression of the second map data when the map data item is added to the second map data.

When the second map data fully filled with map data items is not compressed through the compression operation, the method can further include updating the first map data based on the second map data; either generating new second map data or resetting the second map data; and adding the map data item to the new second map data or the reset second map data.

The method can further include changing an identifier indicating a data structure of the second map data based on whether the second map data is compressed; and adding the map data item to an empty area of the second map data.

The second map data can include at least some map data items, each map data item associating each physical address with each logical address, on which the compression operation is performed. The second map data can include at least one map data item after the second map data is compressed, the at least one map data item including of plural continuous logical addresses corresponding to the at least some map data items and a count value corresponding to the number of the plural continuous logical addresses.

The second map data can be compressed when the at least some map data items correspond to sequential data items programmed in the memory device individually.

The second map data can be stored in a volatile memory. A preset size of the volatile memory allocated for the second map data can be fixed regardless of whether the second map data is compressed or not.

The method can further include skipping compression of a map data item which has been previously compressed in the second map data when the second map data is compressed multiple times.

In another embodiment, a controller can control first map information and second map information used to associate different addresses with each other to engage plural devices that use different address systems. The controller can be configured to: program data input from an external device in a memory device including a plurality of non-volatile memory cells; generate a map data item corresponding to the data; and compress second map data when the second map data includes no empty area for the map data item; and update first map data stored in the memory device based on the second map data, according to whether the second map data is compressed or not.

The controller can be further configured to: add the map data item to the second map data; and skip compression of the second map data when the second map data includes an empty area for the map data item.

When the second map data fully filled with map data items is not compressed through the compression operation, the controller can be further configured to: update the first map data based on the second map data; either generate new second map data or reset the second map data; and add the map data item to the new second map data or the reset second map data.

The controller can be further configured to: change an identifier indicating a data structure of the second map data based on whether the second map data is compressed; and add the map data item to an empty area of the second map data.

Embodiments of the disclosure will now be described with reference to the accompanying drawings, wherein like numbers reference like elements.

FIG. 1 illustrates a memory system 110 according to an embodiment. The memory system 110 may include a memory device 150 and a controller 130. The memory device 150 and the controller 130 may be physically separated from each other in the memory system 110. The memory device 150 and the controller 130 may be connected via at least one data path. For example, the data path may include a channel and/or a way. According to an embodiment, the memory device 150 and the controller 130 may be functionally divided. Further, according to an embodiment, the memory device 150 and the controller 130 may be implemented with a single chip or a plurality of chips.

The memory device 150 may include a plurality of memory blocks 60. The memory block 60 may be understood as a group of non-volatile memory cells in which data is erased together during a single erase operation. The memory block 60 may include a plurality of pages. According to an embodiment, each page may be understood as a group of non-volatile memory cells in which data is stored together during a single program operation or read out together during a single read operation.

The memory device 150 may include a plurality of memory planes or a plurality of memory dies. According to an embodiment, the memory plane may be considered a logical or a physical partition including at least one memory block 60, a driving circuit capable of controlling an array including a plurality of non-volatile memory cells, and a buffer that can temporarily store data to be input to the non-volatile memory cells or data output from non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange data and a signal with the controller 130.

According to an embodiment, the memory device 150 may include at least one memory block 60, at least one memory plane, or at least one memory die. The internal configuration of the memory device 150 shown in FIG. 1 may be changed according to performance of the memory system 110. Therefore, embodiments are not limited to the internal configuration shown in FIG. 1.

Referring to FIG. 1, the memory device 150 may further include a voltage supply circuit 70 capable of supplying at least one type of voltage into the memory block 60. In one embodiment, the voltage supply circuit 70 may supply a read voltage Vrd, a program voltage Vprog, a pass voltage Vpass, and/or an erase voltage Vers into a non-volatile memory cell included in the memory block 60. For example, during a read operation for reading data stored in a selected non-volatile memory cell included in the memory block 60, the voltage supply circuit 70 may supply the read voltage Vrd into the selected non-volatile memory cell. During the program operation for storing data in the selected non-volatile memory cell included in the memory block 60, the voltage supply circuit 70 may supply the program voltage Vprog into the selected non-volatile memory cell. Also, during the read operation or the program operation performed on the selected non-volatile memory cell, the voltage supply circuit 70 may supply a pass voltage Vpass into a non-selected non-volatile memory cell. During an erasing operation for erasing data stored in in the memory block 60, the voltage supply circuit 70 may supply the erase voltage Vers into the memory block 60.

Figure 2:
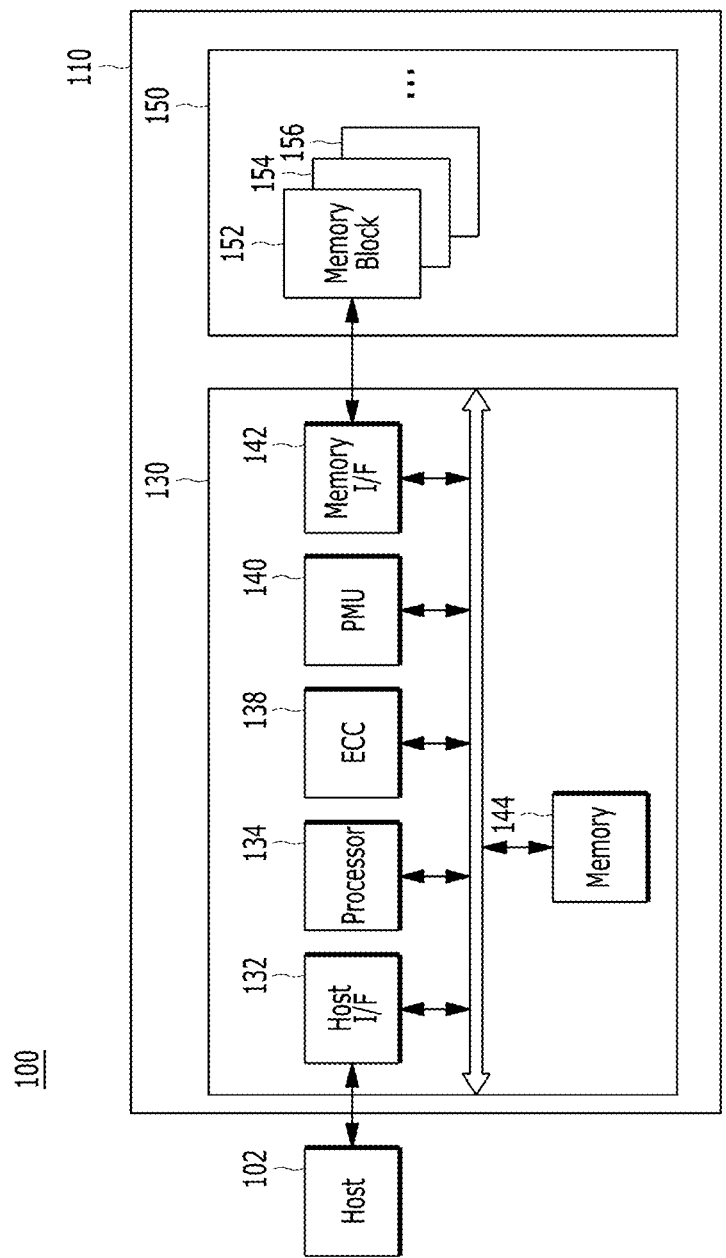
FIG. 2 illustrates a data processing system according to an embodiment.
Figure 3:
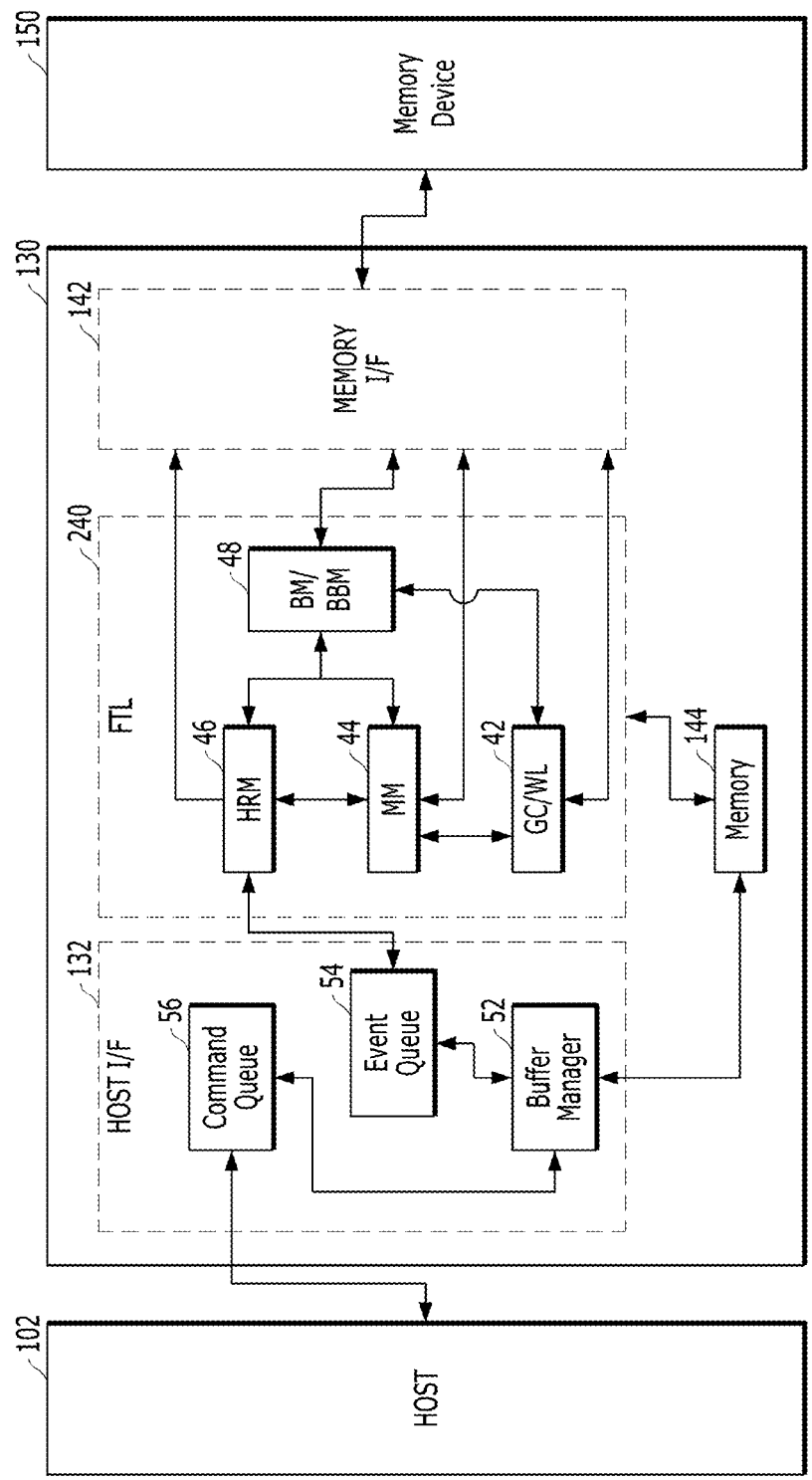
FIG. 3 illustrates a memory system according to an embodiment.

In order to store data requested by an external device, e.g., a host 102 shown in FIGS. 2-3, in the memory device 150 (e.g., a storage space including non-volatile memory cells), the memory system 110 may perform address translation between a file system used by the host 102 and a physical location of the storage space including the non-volatile memory cells. For example, a data address determined according to the file system used by the host 102 may be called a logical address or a logical block address, while an address for the physical location at which data is to be stored in the storage space may be referred to as a physical address or a physical block address.

When the host 102 transfers a logical address to the memory system 110 together with a read request, the memory system 110 searches for a physical address associated with the logical address, reads data stored at a physical location recognized by the physical address, and outputs read data to the host 102. During this procedure, the address translation may be performed in the memory system 110 to search for the physical address associated with the logical address input from the host 102.

The controller 130 may perform a data input/output operation in response to a request input from the external device. For example, when the controller 130 performs a read operation in response to a read request input from the external device, data stored in a plurality of non-volatile memory cells included in the memory device 150 is transferred to the controller 130. In the read operation, an input/output (I/O) controller 192 may perform address translation between a logical address input from the external device and a physical address, and then transmit, to the memory device 150, the physical address and a read command corresponding to the read request through a transceiver 198. The transceiver 198 may transmit the physical address and the read command to the memory device 150 and receive data output from the memory device 150 corresponding to the physical address. The transceiver 198 may temporarily store the data transferred from the memory device 150 in a memory 144. The I/O controller 192 may output the data stored in the memory 144 to the external device in response to the read request.

In addition, the I/O controller 192 may transmit write data input along with a write request from the external device to the memory device 150 through the transceiver 198. After storing the write data in the memory device 150, the I/O controller 192 may transmit a response corresponding to the write request to the external device. The I/O controller 192 may generate or update map data that associates a physical address, which indicates a location where the write data is stored in the memory device 150, with a logical address input along with the write request.

When the I/O controller 192 performs the data input/output operation, a map data controller 196 controls or manages map data used by the controller 130. The map data may include plural map data items, each of which may associate a logical address with a physical address, or vice versa. The map data or the map data item can be used as operation information for the data input/output operation performed by the controller 130. For example, the I/O controller 192 may use the map data for address translation, and map data items may be updated or generated after write data corresponding to a write request is programmed in the memory device 150.

According to an embodiment, the map data may be classified into first map data (e.g., a Logical to Physical (L2P) table) for associating a logical address with a physical address and second map data (e.g., a Physical to Logical (P2L) table) for associating a physical address with a logical address. The map data controller 196 may determine or change a data structure for the first map data or the second map data that is loaded in the memory 144 from the memory device 150.

According to an embodiment, a map data item included in the first map data or the second map data stored in the memory device 150 may associate a single logical address with a single physical address. A plurality of map data items may constitute a single map segment. For example, the map segment may correspond to a group of map data items stored in, or read from, the memory device 150 together. After the controller 130 reads at least some portion of the first map data or the second map data from the memory device 150 and stores the read map data in the memory 144, the controller 130 may utilize the map data stored in the memory 144 to perform data input/output operations. The storage capacity of the memory 144 in the memory system 110 may be limited, and thus a memory space of the memory 144 that is allocated for temporarily storing the first map data or the second map data, each of the first map data and the second map data including plural map data items may be limited. Therefore, the number of map data items included in the first map data or the second map data may also be limited.

A map compressor 194 included in the controller 130 may compress the first map data or the second map data stored in the memory 144 in response to the determination of the map data controller 196. When the map compressor 194 compresses the first map data or the second map data stored in the memory 144, a memory space of the memory 144 allocated for storing the first map data or the second map data may include a free area (or an empty area). The map data controller 196 may add new map data items to the free area in the memory space allocated for storing the first map data or the second map data in the memory 144.

According to an embodiment, the first map data (e.g., L2P table) including plural map data items, e.g., first map information (e.g., Logical to Physical (L2P) information) for associating a logical address with a physical address, may be stored in the memory device 150. The controller 130 may generate the second map data (e.g., P2L table) including plural map data items, e.g., second map information (e.g., Physical to Logical (P2L) information) for associating the physical address with the logical address, during the data input/output operations.

For example, after the controller 130 programs new user data to the memory device 150, the controller 130 may generate a piece of second map information (P2L) for linking a physical address, which indicates the location where the new user data is programmed in the memory device 150, to a logical address input from the host 102 and corresponding to the new user data. The piece of second map information (P2L) may indicate a recent location of the new user data stored in the memory device 150.

In one case, it is assumed that the first map data (L2P table) loaded in the memory 144 includes first map information (L2P) indicating that a specific logical address (e.g., '0A0') and a first physical address (e.g., '123') are associated with each other.

After the controller 130 performs a program operation for new user data corresponding to the specific logical address (e.g., '0A0'), the controller 130 may generate a piece of second map information (P2L) and store it in the memory 144. The piece of second map information (P2L) may associate the logical address (e.g., '0A0') with a second physical address (e.g., '876') indicating the location where the new user data is stored in the memory device 150. In this case, the controller 130 may recognize that the piece of first map information (L2P) included in the first map data (L2P table) is old and the piece of second map information (P2L) is the latest, i.e., recognize that the piece of second map information P2L is the most recent map information. After that, the controller 130 may update the first map data (L2P table) stored in the memory device 150 based on the piece of second map information P2L.

As described above, the controller 130 may perform a map flush operation (e.g., an operation for updating the first map data (L2P table) stored in the memory device 150) periodically, intermittently, or as needed. After the map flush operation is performed, the second map data (P2L table) including the piece of second map information (P2L) stored in the memory 144 may be deleted or destroyed. When an operation for programming user data in the memory device 150 is performed after the map flush operation is performed, the controller 130 may generate new second map data (P2L table).

A timing for performing the map flush operation may be determined differently according to embodiments. For example, when the controller 130 performs a predetermined number of program operations, e.g., 10 program operations, the controller 130 may determine that the map flush operation should be performed. For another example, when a memory space of the memory 144 allocated for the second map data (P2L table) is full and thus a new piece of second map information (P2L) cannot be added into the memory space, the controller 130 may determine that the map flush operation should be performed. For still another example, the controller 130 may determine performing the map flush operation every predetermined period (e.g., 1 hour, 10 minutes, or 1 minute).

A map flush operation may be performed in the memory system 110 when the memory system 110 has an independent or different address scheme from that of an external device such as the host 102. The external device might not request the memory system 110 to perform a map flush operation. The memory system 110 performs the map flush operation independently from the external device, so that data input/output operations requested by the external device may be delayed during the map flush operation. The map flush operation, which is performed within the memory system 110, may be overheads from a perspective of the external device. Thus, when the map flush operation is performed too frequently, data input/output performance may be deteriorated.

On the other hand, if a map flush operation has been not performed for a long time, an amount of invalid map information, which is no longer used for address translation, may increase in the first map data (L2P table) stored in the memory device 150. In this case, operation safety of the memory system 110 may be deteriorated, and an amount of map information that the controller 130 should check or frequency that the controller 130 should check map data for performing address translation associated with a read request may increase. When the first map data (L2P table) does not include recent map information, the controller 130 may refer to the second map data (P2L table) stored in the memory 144 for address translation. Also, if a map flush operation has been not performed for a long time, an amount of the second map data (P2L table) stored in the memory 144 may increase and thus usage efficiency of the memory 144 may be deteriorated.

Referring to FIG. 1, after the I/O controller 192 stores user data transmitted from the external device in the memory device 150, a map data item for associating a physical address with a logical address may be generated. The map data controller 196 may add the map data item generated by the I/O controller 192 to the second map data (P2L table) stored in the memory 144. When there is an empty area in the memory space allocated for the second map data (P2L table), the map data controller 196 may add the map data item to the second map data (P2L table).

Because the controller 130 allocates an area of a preset size (i.e., limited area) for the second map data (P2L table), the map data controller 196 cannot add the map data item to the second map data (P2L table) if the memory space allocated for the second map data (P2L table) is fully filled with a plurality of map data items. When the map data item cannot be added to the second map data (P2L table), the map data controller 196 may perform a map flush operation. However, the map compressor 194 may determine whether to compress map data items in the second map data (P2L table) and perform a compression operation on the second map data (P2L table) when the second map data (P2L table) is compressible, according to an embodiment.

When the map compressor 194 compresses the second map data (P2L table), an empty area can be generated in the memory space allocated for the second map data (P2L table) so that the map data controller 196 may add another map data item to the empty area. However, when the map compressor 194 may not compress any map data items in the second map data (P2L table), the map data controller 196 cannot add another map data item to the second map data (P2L table) because the memory space allocated for the second map data (P2L table) has been fully filled with map data items.

When it is not possible to add a new map data item to the second map data (P2L table), the map data controller 196 may perform a map flush operation. After performing the map flush operation, the second map data (P2L table) may be reset, or new second map data may be generated. Then, the new map data item may be added to the generated second map data.

A timing at which the memory space allocated for the second map data (P2L table) is fully filled with map data items may be changed according to whether the second map data (P2L table) is compressed or not. When the map flush operation is set to be performed when the memory space allocated for the second map data (P2L table) is full, a timing at which the map flush operation is performed may be changed in response to whether the second map data (P2L table) is compressed or not.

For example, when a plurality of requests input from the external device relate to sequential data, a plurality of map data items stored in the second map data (P2L table) may be compressed by the map compressor 194. When map data items regarding the sequential data are included in the plurality of map data items stored in the second map data (P2L table), the map data items regarding the sequential data can be compressed so that the timing of the map flush operation may be delayed. If the timing of the map flush operation is delayed, data input/output performance of the memory system 110 may be improved.

In an embodiment, the controller 130, e.g., the map compressor 194, compresses the second map data (P2L table) multiple times. But, in another embodiment, the controller 130 might not compress a map data item which has been previously compressed in the second map data (P2L table).

With reference to FIGS. 2 and 3, some operations that may be performed by the memory system 110 of FIG. 1 will be described.

Referring to FIG. 2, a data processing system 100 may include a host 102 engaged or interlocked with a memory system 110 that corresponds to the memory system 110 of FIG. 1. The host 102 may include a portable electronic device (e.g., a mobile phone, an MP3 player, a laptop computer, or the like) or a non-portable electronic device (e.g., a desktop computer, a game player, a television, a projector, or the like).

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102. For example, the host 102 and the memory system 110 may use a predetermined protocol to transmit and receive data therebetween. Examples of protocols or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a kind of layer for exchanging data with the host 102 and is implemented with, or driven by, firmware called a host interface layer (HIL).

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a kind of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a kind of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal (e.g., a correction success signal or a correction fail signal), based on a result of the error correction decoding. The error correction circuitry 138 may use a parity bit, which has been generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. The hard decision decoding in which a value output from a non-volatile memory cell is coded as 0 or 1. Compared to the hard decision decoding, the soft decision decoding can determine the value stored in the non-volatile memory cell based on the stochastic information. Regarding bit-flipping (which may be considered an error that can occur in the memory device 150), the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code (for example, a Hamming code) in two or three dimensions and repeat decoding in a row direction and a column direction to improve reliability of values.

The power management unit (PMU) 140 may control electrical power provided to the controller 130. The PMU 140 may monitor the electrical power supplied to the memory system 110 (e.g., a voltage supplied to the controller 130) and provide the electrical power to components included in the controller 130. The PMU 140 may not only detect power-on or power-off, but also generate a trigger signal to enable the memory system 110 to back up a current state urgently when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102. In addition, the controller 130 may temporarily store write data input from the host 102 in the memory 144 before programming the write data in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIG. 3. According to an embodiment, the processor 134 may be implemented with a microprocessor, a central processing unit (CPU), or the like.

According to an embodiment, the memory system 110 may be implemented with at least one multi-core processor. The multi-core processor is a kind of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. Meanwhile, as a background operation that is performed without a command transmitted from the host 102, the controller 130 can perform garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform a parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered as an interleaving method. Because a data input/output speed of the memory system 110 increases by operating with the interleaving method, data I/O performance of the memory system 110 can be improved.

By the way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In one embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 that includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data (e.g., two or more bits of data). The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use a MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in a MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in a MLC. According to an embodiment, an operation for uniformly levelling threshold voltages of the MLCs may be carried out before another 1-bit data is programmed in the same MLCs, each having stored another-bit data.

In an embodiment, the memory device 150 is embodied as a non-volatile memory such as a flash memory, for example, as a NAND flash memory, a NOR flash memory, or the like. In another embodiment, the memory device 150 may be implemented by at least one of a phase change random access memory (PCRAM), a ferroelectrics random access memory (FRAM), a spin injection magnetic memory (STT- RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a commands for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what kind of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events inputting to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In one embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected to an empty block and erase data stored in the selected block so that the block manager 48 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and currently issue an update request. When the state manager 42 requests the map update in a state in which the copying of the valid page(s) is not completed normally, the map manager 44 might not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
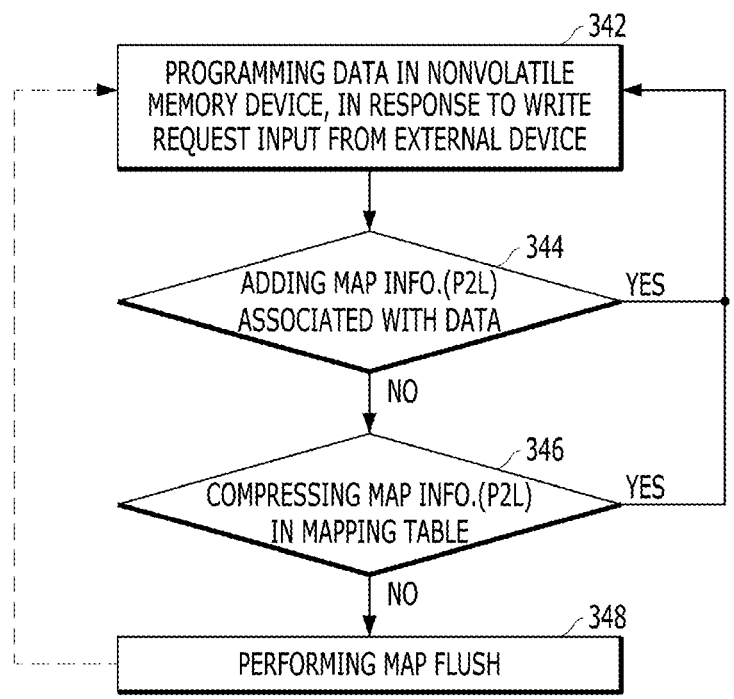
FIG. 4 illustrates a method for operating a memory system according to an embodiment.

FIG. 4 illustrates a method of operating a memory system according to an embodiment of the disclosure. The method illustrated in FIG. 4 may be described with reference to at least one of FIGS. 1 to 3.

Referring to FIG. 4, the method of operating the memory system may include programming write data into a non-volatile memory device in response to a write request input from an external device (342), and adding a map data item (P2L) associated with the write data to a map table, e.g., second map data (P2L Table) (344). The method may include at least one of compressing map data items in the map table, e.g., the second map data (346) or performing a map flush operation (348).

Along with a write request from the external device (e.g., the host 102 shown in FIG. 2 or 3), a logical address and the write data may be input to the memory system 110. The memory system 110 may store the write data corresponding to the write request in the memory device 150 including non-volatile memory cells (342).

After storing the write data in the memory device 150, the memory system 110 may generate a map data item (P2L) that associates a physical address indicating a location where the write data is stored in the memory device 150 with the logical address input from the host 102. The map data item (P2L) is generated because the host 102 and the memory system 110 use different address schemes.

When the host 102 transmits a read request to the memory system 110 to obtain data stored in the memory system 110, the host 102 sends a logical address along with the read request to the memory system 110. After performing address translation to find a physical address associated with the logical address, the memory system 110 may read the data stored in a location corresponding to the physical address and transmit the read data to the host 102.

The memory system 110 may use first map data (L2P table) in which a logical address is associated with a physical address for address translation. Meanwhile, in a program operation corresponding to a write request, it is easy to generate second map data (P2L table) linking a physical address to a logical address for programming write data. The controller 130 adds a map data item (P2L) to the second map data (P2L table) stored in the memory 144 during the program operation, and then performs a map flush operation for updating the first map data (L2P table) stored in the memory device 150 based on the second map data (P2L table) (348).

Whenever write data is stored in the memory device 150 through a program operation, a map data item (P2L) may be generated. If the map flush operation is performed whenever the map data item (P2L) is generated, input/output performance of the memory system 110 may be degraded or lowered because a data input/output operation could not be performed while the map flush operation is performed. The controller 130 may operate the second map data (P2L table) to collect map data items (P2L) generated whenever the write data is stored in the memory device 150.

After storing the write data in the memory device 150, the memory system 110 may add a map data item (P2L) related to the write data to the second map data (P2L table) (344). When the map data item (P2L) is added to an empty area of a memory space allocated for the second map data (P2L table), the memory system 110 may be in a ready state in which other write data (or next write data) can be programmed (342).

When the map data item (P2L) cannot be added to the second map data (P2L table) because there is no empty area in the memory space allocated for the second map data (P2L table), the memory system 110 may compress map data items included in the second map data (P2L table) (346). When at least some of the map data items in the second map data (P2L table) are compressed, an empty area may be generated in the memory space allocated for the second map data (P2L table) and thus the memory system 110 may add the map data item (P2L) to the second map data (P2L table). Thereafter, the memory system 110 may return to the ready state in which other write data is programmed (342).

When at least some of the map data items included in the second map data (P2L table) are not compressed, an empty area may not be generated in the memory space allocated for in the second map data (P2L table). In this case, the memory system 110 may perform the map flush operation to update the first map data (L2P table) in the memory device 150 based on the map data items included in the second map data (P2L table) (348). When the map flush operation is performed, the existing second map data (P2L table) may be reset or deleted. When the second map data (P2L table) is reset, the map data item (P2L) can be added to the second map data (P2L table). When the second map data (P2L table) is deleted, the memory system 110 may generate new second map data (P2L table) and then the map data item (P2L) can be added to the new second map data (P2L table). After performing the map flush operation, the memory system 110 may return to the ready state in which other write data can be programmed (342).

Figure 5A:
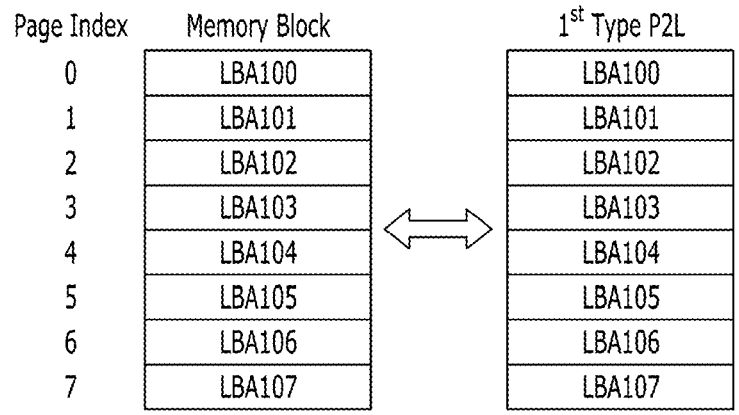
FIGS. 5A to 5C illustrate structural change of map data in a memory system according to an embodiment.
Figure 5B:
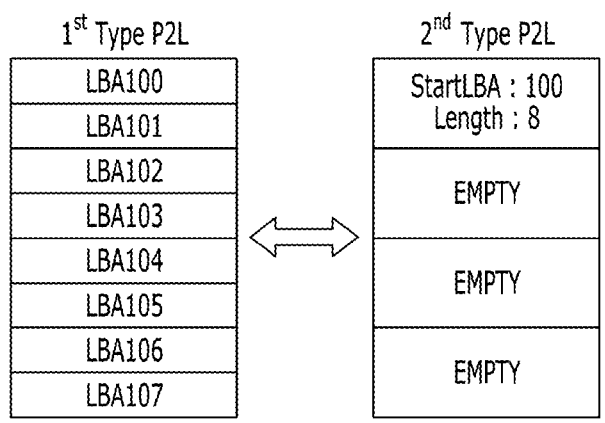
Figure 5C:
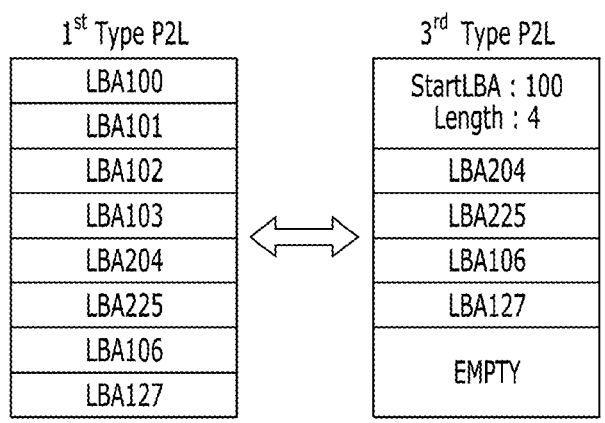

FIGS. 5A to 5C illustrate structural change of map data in a memory system according to an embodiment. Specifically, FIGS. 5A to 5C show the change of second map data (P2L table) according to whether at least some map data items in the second map data (P2L table) are compressed or not. The change of the second map data (P2L table) illustrated in FIGS. 5A to 5c may be described with reference to at least one of FIGS. 1 to 3.

Referring to FIG. 5A, a plurality of memory blocks may be included in the memory device 150. A memory block illustrated in FIG. 5A may include 8 pages as an example, and the 8 pages may be identified by page indices 0 to 7. According to an embodiment, when combining a block address for distinguishing a memory block from other memory blocks and a page index, the memory device 150 may use a combined one as a physical address indicating a location where a data item is stored in the memory device 150.

In a programming operation, data items corresponding to logical addresses LBA100 to LBA107 may be sequentially stored in the 8 pages respectively identified by the page indices 0 to 7 in the memory block. After programming the data items corresponding to the logical addresses LBA100 to LBA107 into the memory block, the controller 130 may add plural map data items to the second map data (P2L table) in the memory 144.

As illustrated in FIG. 5A, the plural map data items generated when the data items are programmed in the memory device 150 may be sequentially stored in the second map data, e.g., 1st Type P2L table. The second map data (1st Type P2L table) may include the logical addresses LBA100 to LBA107 corresponding to the data stored in the memory block. A first map data item of the second map data (1st Type P2L table) having a first data structure may show that a data item corresponding to the first logical address LBA100 is stored in a location indicated by the first page 0 of the memory block in the memory device 150. The logical address LBA100 associated with the data item stored in the first page 0 of the memory block may be stored as the first map data item of the second map data (1st Type P2L table). Because the data items corresponding to the 8 logical addresses LBA100 to LBA107 is sequentially stored in the 8 pages 0 to 7 of the memory block, the second map data (1st Type P2L table) having the first data structure includes the 8 logical addresses LBA100 to LBA107. That is, the 8 logical addresses LBA100 to LBA107 may be sequentially stored in a memory space allocated for the second map data (1st Type P2L table).

After the 8 map data items are added to the second map data (1st Type P2L table) having the first data structure shown in FIG. 5A, the memory system 110 may program a next data item in the memory device 150. The memory system 110 may generate a map data item corresponding to the next data item programmed in the memory device 150. However, when the memory space allocated for the second map data (1st Type P2L table) has been fully filled with map data items, the memory system 110 may not add the generated map data item to the second map data (1st Type P2L table).

For example, when the second map data has the first data structure and the controller 130 stores 50 data items in the memory device 150, 50 logical addresses respectively corresponding to the 50 data items are added to the second map data (1st Type P2L table) in the memory 144. In this case, the second map data (1st Type P2L table) should have an empty area for storing at least 50 map data items. However, when an empty area of the memory space allocated for the second map data (1st Type P2L table) in the memory 144 is not sufficient to store 50 map data items, e.g., to store the 50 logical addresses, the controller 130 removes one or more map data items from the second map data (1st Type P2L table) before storing the 50 data items in the memory device 150. When the memory space allocated for the second map data (1st Type P2L table) is full before the 50 data items are programmed in the memory device 150, the controller 130 may perform an operation for updating first map data in the memory device 150 based on the map data items stored in the second map data (1st Type P2L table). This operation may be referred to as a map flush operation. While the map flush operation is performed, the operation for programming some of the 50 data items in the memory device 150 may be delayed.

To postpone or delay a timing of performing the map flush operation, the memory system 110 may compress the second map data (1st Type P2L table) shown in FIG. 5A. The second map data (1st Type P2L table) may include a plurality of map data items generated while a data I/O operation regarding sequential data items is performed. In this case, the memory system 110 may compress the second map data in a way where the plurality of map data items is converted into a single map data item including a start address of a plurality of logical addresses corresponding to the sequential data and a count value (Length) of the plurality of logical addresses. The controller 130 may compress at least some of map data items included in the second map data (1st Type P2L table), which are generated while the data I/O operation regarding the sequential data items is performed, to generate second map data having a second data structure (e.g., 2nd Type P2L table shown in FIG. 5B). The start address of the plurality of logical addresses may correspond to first data in the sequential data items, and the count value of the plurality of logical addresses may correspond to how many pieces of data are included in the sequential data items.

For example, referring to FIG. 5B, eight data items corresponding to the eight logical addresses LBA100 to LBA107 are sequentially stored in the eight pages 0 to 7 of the memory block. When the eight data items are sequentially stored in the memory block, the first logical address LBA100 among the eight logical addresses LBA100 to LBA107 is added in a first item of the second map data having the second data structure (2nd Type P2L table) as the start address of the eight logical addresses LBA100 to LBA107, and eight (Length: 8) is added in the first item as the count value regarding the eight logical addresses LBA100 to LBA107.

Referring to two cases shown in FIGS. 5A and 5B, when the eight data items corresponding to the eight logical addresses LBA100 to LBA107 is stored in the eight pages 0 to 7 of the memory block, the second map data having the first data structure (1st Type P2L table) can be fully filled with the eight map data items corresponding to the eight logical addresses LBA100 to LBA107, but the second map data having the second data structure (2nd Type P2L table) is not fully filled with map data items. When the second map data having the second data structure (2nd Type P2L table) is not fully filled, i.e., when an empty area is obtained by compression of map data items, the controller 130 can add a new map data item to the second map data and perform another program operation to program another data item in the memory device 150 before performing a map flush operation. When the controller 130 can delay a timing of flushing plural map data items to the memory device 150 and perform additional program operations regarding other data items, data input/output performance of the memory system 110 may be improved.

According to an embodiment, when the memory space allocated for the second map data (P2L table) is fixed, according to a data structure of the second map data (P2L table) generated by the controller 130, a time of fully filling the second map data (P2L table) with map data items may be changed. If the time of fully filling the second map data (P2L table) with map data items is changed, the timing at which a map flush operation is performed may be changed.

According to an embodiment, when the memory space allocated for the second map data (P2L table) is not fixed, depending on the data structure of the second map data (P2L table) generated by the controller 130, the size of the memory space allocated for the second map data (P2L table) may be changed. The storage capability of the memory 144 is finite. Thus, when a memory space required for storing the second map data (P2L table) is reduced, the controller 130 may allocate and distribute an available memory space for another operation and purpose. Through this procedure, when more available resources are allocated or distributed for data input/output operations, the controller 130 may improve data input/output performance of the memory system 110.

Referring to FIG. 5C, the memory system 110 can compress at least some of map data items included in the second map data (P2L table) and thus generate second map data having a third data structure (e.g., 3rd Type P2L table). The controller 130 may store plural map data items in the second map data while performing data input/output operations regarding a mixed pattern of random data items and sequential data items. For example, when plural requests input from the external device such as the host 102 to the memory system 110 are related to the mixed pattern of random data items and sequential data items, the controller 130 may compress map data items for the sequential data items only to generate the second map data having the third data structure (3rd Type P2L table), where a part of the map data items included in the second map data can be compressed.

According to an embodiment, when the memory space allocated for the second map data (P2L table) is full, the memory system 110 may attempt to compress plural map data items included therein. When the memory system 110 attempts to compress the plural map data items and at least some map data items are compressed, the timing of performing the map flush operation may be delayed. On the other hand, when the map data items are not compressed, the map flush operation may be performed in the same way as when no compression is attempted. In addition, performing compression on the map data items whenever a new map data item is added to the second map data (P2L table) may generate unnecessary overheads in the data input/output operation of the memory system 110. Therefore, the overheads may be reduced by attempting to compress map data items only when the second map data (P2L table) is full.

Figure 6:
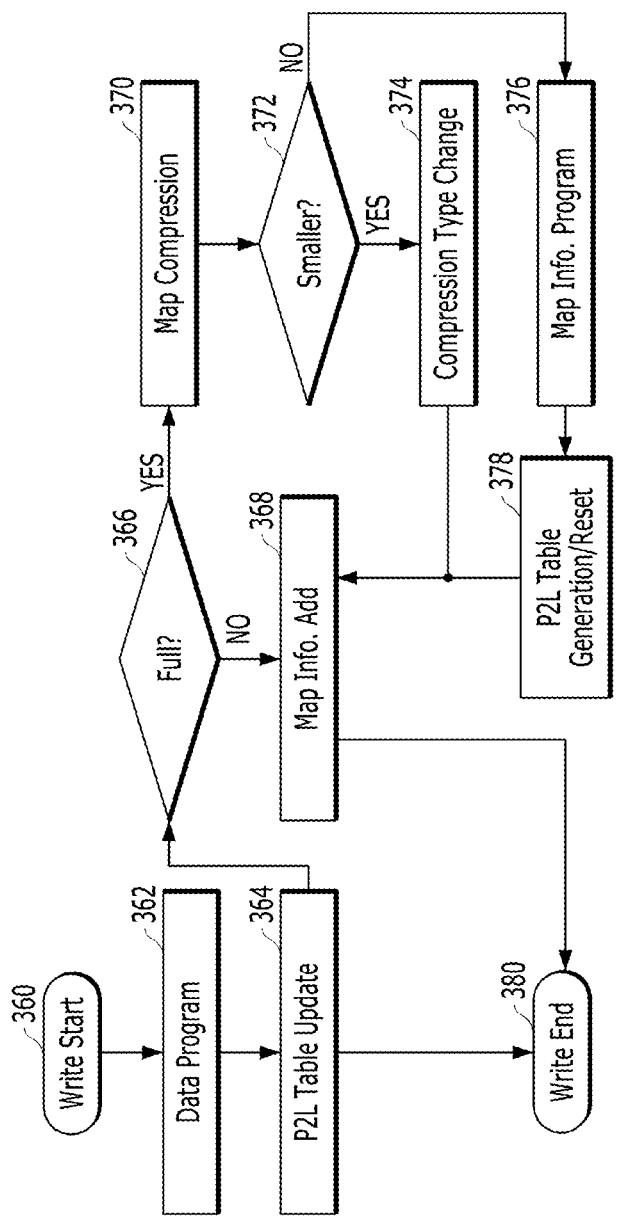
FIG. 6 illustrates a method for operating a memory system according to another embodiment.

FIG. 6 illustrates a method of operating a memory system according to another embodiment.

Referring to FIG. 6, the method of operating the memory system may include beginning a write operation (360), programming data (362), updating map data (364), and terminating the write operation (380).

When data and a logical address are input to the memory system 110 together with a write request from an external device (e.g., the host 102 shown in FIG. 2 or 3), the write operation may be started (360). As described with reference to FIGS. 2 and 3, the external device may transmit a plurality of requests or commands to the memory system 110, and the memory system 110 may schedule operations corresponding to the plurality of requests or commands. According to the scheduling, the memory system 110 may begin each write operation in response to each write request (360).

The memory system 110 may program the data corresponding to the write request into the memory device 150 (362). The memory device 150 includes an open memory block capable of storing data items, and the data items may be sequentially programmed or stored in the open memory block according to an order of write operations for the data items. Here, the open memory block may be a memory block included in a specific die or plane. Or, the open memory block may include a super block including a plural of memory blocks distributed over plural dies or planes.

After the memory system 110 stores the data items in the memory device 150, the memory system 110 generates a map data item that associates a physical address indicating a location in the memory device 150 in which the data is stored with a logical address input along with the data from the external device. The memory system 110 may add the map data item to the second map data (P2L table) (364). For example, the second map data (P2L table) may be generated corresponding to the open memory block. In this case, an index in the second map data (P2L table) may indicate the location in which the data is stored, so that the map data item may be generated and added by writing the associated logical address in a memory space corresponding to the index of the second map data (P2L table).

The operation (364) for updating the second map data (P2L table) with the map data item (Map Info.) corresponding to the programmed data items may include determining whether the second map data (P2L table) is full or not (366). When the second map data (P2L table) is not full (NO in the operation 366), the memory system 110 may add the map data item to the second map data (P2L table) (368). Through this, the operation (364) of updating the second map data (P2L table) with the map data item corresponding to the programmed data items is completed. Then, the writing operation may be terminated (380).

On the other hand, when the second map data (P2L table) is full (YES in the operation 366), it is difficult to add the map data item to the second map data (P2L table). Therefore, the memory system 110 may try to compress the second map data (P2L table) (370). Here, the compression (370) of the second map data (P2L table) may refer to the examples described in FIG. 5B or 5C. When at least some map data items among plural map data items included in the second map data (P2L table) may be compressed, the memory system 110 can secure an empty area in the memory space allocated for the second map data (P2L table).

After the operation (370) of compressing the second map data (P2L table), the memory system 110 may check whether a size of the second map data (P2L table) is decreased (372). Here, size reduction of the second map data (P2L table) may indicate that at least some of the plural map data items included in the second map data (P2L table) is compressed, resulting in generating an empty area in the memory space allocated for the second map data (P2L table). Thus, another map data item can be added to the second map data (P2L table).

If the size of the second map data (P2L table) decreases (YES in the operation 372), the memory system 110 can change an identifier or a parameter indicating a data structure of the second map data (P2L table) in response to whether the at least some map data items are compressed or not (374). Because an empty area in the memory space allocated for the second map data (P2L table) is secured, the memory system 1100 may add the map data item to the second map data (P2L table) (368). Through these operations, the map data item corresponding to the programmed data may be added, i.e., the operation (364) of updating the second map data (P2L table) with the map data item may be completed, and then the writing operation may also be terminated (380).

If the size of the second map data (P2L table) is not reduced (NO in the operation 372), the second map data (P2L table) is still filled with plural map data items so that another map data item cannot be added to the second map data (P2L table). The memory system 110 may update the first map data (L2P table) stored in the memory device 150 based on the second map data (P2L table) (376). This operation may correspond to the map flush operation or map update described above.

After updating the first map data (376), the memory system 110 may reset or initialize the existing second map data (P2L table) stored in the memory 144 (378). According to an embodiment, the memory system 110 may delete the existing second map data (P2L table) and generate new second map data (P2L table) (378). Because the reset or generated second map data (P2L table) has an empty space, the memory system 110 may add the map data item corresponding to the programmed data to the reset or generated second map data (P2L table) (368). Through these operations, adding the map data item corresponding to the programmed data to the second map data (364) is completed, and the writing operation may be terminated (380).

Figure 7:
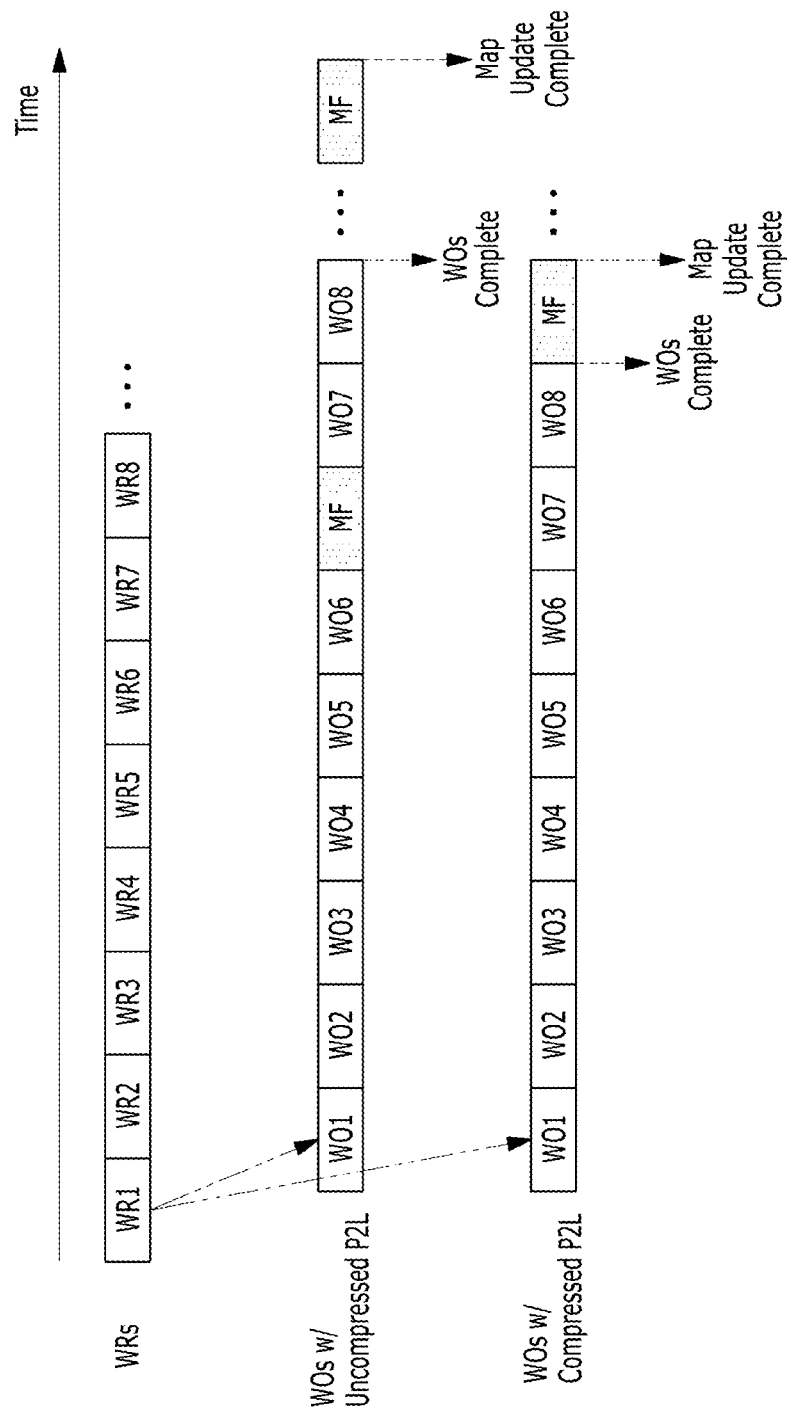
FIG. 7 illustrates data input/output operations performed by a memory system according to an embodiment.

FIG. 7 illustrates data input/output operations performed by a memory system according to an embodiment.

Referring to FIG. 7, the memory system 110 shown in FIGS. 1 to 3 receives a plurality of write requests WRs input from an external device. For example, the plurality of write requests WRs may include eight write requests WR1 to WR8. The memory system 110 may receive the eight write requests WR1 to WR8 together with eight pieces of data corresponding to eight logical addresses. In an embodiment, it could be assumed that the eight write requests WR1 to WR8 may be associated with a multiple of eight sequential data items, individually. The memory system 110 may perform eight write operations WO1 to WO8 corresponding to the eight write requests WR1 to WR8. In FIG. 7, I/O performance in the memory system 110 is changed according to whether at least some map data items are compressed or not.

The memory system 110 according to an embodiment of the disclosure may generate a map data item whenever each of the eight write operations WO1 to WO8 corresponding to the eight write requests WR1 to WR8 is performed. Referring to FIG. 5A, the map data item generated for each write operation may be sequentially stored in the second map data (P2L table). In FIG. 7, it is assumed that there is an empty area for storing less than eight map data items in the second map data (P2L table).

For example, it is assumed that a memory space allocated for the second map data (P2L table) is fully filled with map data items generated in the six write operations WO1 to WO6 among the eight write operations WO1 to WO8. The memory system 110 may attempt to compress the second map data (P2L table). When the second map data (P2L table) is not compressed (Uncompressed P2L table), i.e., the memory space for the second map data (P2L table) is full, another map data item (e.g., a map data item (P2L) generated in the 7th write operation WO7) cannot be added to the second map data (P2L table), so the map flush operation (MF) may be performed to generate an empty area in the memory space. Due to the map flush operation (MF), the seventh write operation WO7 and the eighth write operation WO8 may be delayed. Because the other two write operations WO7 to WO8 among the eight write operations WO1 to WO8 are delayed, a time point at which the memory system 110 notifies the external device of the completion of the eight write operations WO1 to WO8 may be postponed. Also, updating the first map data (L2P table) based on map data items generated corresponding to the seventh write operation WO7 and the eighth write operation WO8 performed after the map flush operation (MF) may be delayed until the next map flush operation (MF) is performed.

On the other hand, it is assumed that an empty area is secured by the second map data (Compressed P2L table) through compression attempted by the memory system 110. The memory system 110 may store map data items generated in the write operations WO7 to WO8 among the eight write operations WO1 to WO8 in the empty area for the second map data (P2L table). The memory system 110 may continuously perform the eight write operations WO1 to WO8 without the map flush operation (MF), and the time point of notifying the external device of the completion of the eight write operations WO1 to WO8 may not be delayed.

Referring to FIGS. 5B to 5C, when a write operation for sequential data items is performed, at least some map data items in the second map data P2L table may be compressed to reduce a size of the second map data (P2L table). Accordingly, the map flush operation (MF) may occur after all eight write operations WO1 to WO8 are performed, and the write operations corresponding to the eight write requests WR1 to WR8 input from the external device is completed by the memory system 110. The time point of notifying the external device of the completion of the write operations may be faster. In addition, all map data items corresponding to the eight write operations WO1 to WO8 can be stored in the memory device 150 through a single map flush operation (MF). As compared to uncompressed second map data (Uncompressed P2L table), the compressed second map data (Compressed P2L table) may improve operational stability of the memory system 110.

FIG. 7 illustrates an example of how operational performance or operational stability of the memory system 110 is improved depending upon compression of the second map data (P2L table).

When the memory system 110 receives write requests for storing a large amount of data input from an external device, the large amount of data may include sequential data items. In this case, as a map flush operation (MF) is delayed to a greater extent in a process of storing the large amount of data, the external device may recognize that the operational performance of the memory system 110 is improved to a greater extent.

According to an embodiment, the memory system 110 may generate at least one of an identifier or parameter indicating whether the second map data (P2L table) is compressed or not or another identifier or parameter indicating a data structure of second map data (P2L table). The controller 130 may utilize an identifier or parameter to set or establish a data structure or type of the second map data (P2L table), so that how to use the second map data (P2L table) during the map flush operation (MF) can be improved.

According to an embodiment of the disclosure, the memory system can determine whether a map data item temporarily stored in a cache memory or volatile memory is compressed or not, to thereby change a timing of performing a map update or map flush operation, e.g., updating map data stored in a non-volatile memory device based on the map data item stored in the cache memory or volatile memory.

According to an embodiment of the disclosure, the memory system may improve data input/output performance by compressing the map data item stored in the cache memory or volatile memory used by the controller.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
   a memory device including a plurality of non-volatile memory cells; and
   a controller configured to program data input from an external device in the memory device, generate a map data item corresponding to the data, determine whether second map data is fully filled with map data items, perform a compression operation on the second map data when the second map data includes no empty area for the map data item, and add the map data item to the second map data when the second map data is compressed,
   wherein a timing of updating first map data stored in the memory device based on the second map data is determined according to whether the second map data is compressed or not.

2. The memory system according to claim 1, wherein, when the second map data includes an empty area for the map data item, the controller adds the map data item to the second map data, and performs no compression operation on the second map data.

3. The memory system according to claim 1, wherein the controller is configured to, when the second map data fully filled with the map data items is not compressed through the compression operation, update the first map data based on the second map data, either generate new second map data or reset the second map data, and add the map data item to the new second map data or the reset second map data.

4. The memory system according to claim 1, wherein the controller is configured to change an identifier indicating a data structure of the second map data based on whether the second map data is compressed.

5. The memory system according to claim 1, wherein the second map data includes at least some map data items, each map data item associating each physical address with each logical address, on which the compression operation is performed, and
   the second map data includes at least one map data item after the second map data is compressed, the at least one map data item including a start logical address of plural continuous logical addresses corresponding to the at least some map data items and a count value corresponding to the number of the plural continuous logical addresses.

6. The memory system according to claim 5, wherein the second map data is compressed when the at least some map data items correspond to sequential data items programmed in the memory device individually.

7. The memory system according to claim 1, wherein the second map data is stored in a volatile memory, and the controller is configured to allocate a preset size of the volatile memory for the second map data, wherein the preset size is fixed regardless of whether the second map data is compressed or not.

8. The memory system according to claim 1, wherein the controller is configured to compress the second map data multiple times, and the controller is configured not to compress a map data item which has been previously compressed in the second map data.

9. A method for operating a memory system, the method comprising:
   programming data input from an external device in a memory device including a plurality of non-volatile memory cells;
   generating a map data item corresponding to the data;
   determining whether second map data is fully filled with map data items;
   compressing the second map data when the second map data includes no empty area for the map data item; and
   adding the map data item to the second map data when the second map data is compressed,
   wherein a timing of updating first map data stored in the memory device based on the second map data is determined according to whether the second map data is compressed or not.

10. The method according to claim 9, further comprising:
    adding the map data item to the second map data and skip compression of the second map data when the second map data includes an empty area for the map data item.

11. The method according to claim 9, further comprising:
    when the second map data fully filled with the map data items is not compressed through the compression operation,
    updating the first map data based on the second map data;
    either generating new second map data or resetting the second map data; and
    adding the map data item to the new second map data or the reset second map data.

12. The method according to claim 9, further comprising:
    changing an identifier indicating a data structure of the second map data based on whether the second map data is compressed; and
    adding the map data item to an empty area of the second map data.

13. The method according to claim 9, wherein the second map data includes at least some map data items, each map data item associating each physical address with each logical address on which the compression operation is performed, and
    the second map data includes at least one map data item after the second map data is compressed, the at least one map data item including a start logical address of plural continuous logical addresses corresponding to the at least some map data items and a count value corresponding to the number of the plural continuous logical addresses.

14. The method according to claim 13, wherein the second map data is compressed when the at least some map data items correspond to sequential data items programmed in the memory device individually.

15. The method according to claim 9, the second map data is stored in a volatile memory, and a preset size of the volatile memory allocated for the second map data is fixed regardless of whether the second map data is compressed or not.

16. The method according to claim 9, further comprising:
    skipping compression of a map data item which has been previously compressed in the second map data when the second map data is compressed multiple times.

17. A controller which controls first map information and second map information used to associate different addresses with each other to engage plural devices that use different address systems, the controller is configured to:
    program data input from an external device in a memory device including a plurality of non-volatile memory cells;
    generate a map data item corresponding to the data;
    determine whether second map data is fully filled with map data items;
    compress the second map data when the second map data includes no empty area for the map data item;

adding the map data item to the second map data when the second map data is compressed; and update first map data stored in the memory device based on the second map data, according to whether the second map data is compressed or not.

18. The controller according to claim 17, wherein the controller is further configured to:

add the map data item to the second map data and skip compression of the second map data when the second map data includes an empty area for the map data item.

19. The controller according to claim 17, wherein the controller is further configured to:

when the second map data fully filled with the map data items is not compressed through the compression operation, update the first map data based on the second map data;

either generate new second map data or reset the second map data; and add the map data item to the new second map data or the reset second map data.

20. The controller according to claim 17, wherein the controller is further configured to:

change an identifier indicating a data structure of the second map data based on whether the second map data is compressed; and add the map data item to an empty area of the second map data.

\* \* \* \* \*